United States Patent
Kim et al.

(10) Patent No.: US 11,618,342 B2
(45) Date of Patent: Apr. 4, 2023

(54) APPARATUS AND METHOD FOR CONTROLLING BATTERY OF VEHICLE

(71) Applicants: Hyundai Motor Company, Seoul (KR); Kia Motors Corporation, Seoul (KR)

(72) Inventors: Dae Kwang Kim, Gyeonggi-do (KR); Young Ho Jung, Seoul (KR); Sang Jae Han, Gyeonggi-do (KR); Sung Tae Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 277 days.

(21) Appl. No.: 17/034,996

(22) Filed: Sep. 28, 2020

(65) Prior Publication Data
US 2021/0331602 A1    Oct. 28, 2021

(30) Foreign Application Priority Data
Apr. 27, 2020    (KR) ........................ 10-2020-0050541

(51) Int. Cl.
| | | |
|---|---|---|
| *B60L 58/13* | (2019.01) | |
| *B60L 58/21* | (2019.01) | |
| *B60L 50/62* | (2019.01) | |
| *B60L 58/22* | (2019.01) | |

(52) U.S. Cl.
CPC ............... *B60L 58/13* (2019.02); *B60L 50/62* (2019.02); *B60L 58/21* (2019.02); *B60L 58/22* (2019.02); *B60L 2250/16* (2013.01)

(58) Field of Classification Search
CPC .......... B60L 58/13; B60L 50/62; B60L 58/21; B60L 58/22; B60L 2250/16; B60L 58/12; Y02T 10/62; Y02T 10/70; B60R 16/033; B60R 16/005; B60R 16/0307; G01R 19/16542; G01R 31/382; H02J 7/0016; H02J 7/0047; H02J 7/00712
USPC ......................................................... 320/137
See application file for complete search history.

(56) References Cited

U.S. PATENT DOCUMENTS

| | | | | |
|---|---|---|---|---|
| 5,483,165 | A * | 1/1996 | Cameron ................. | B60L 58/22 340/636.15 |
| 9,018,894 | B2 * | 4/2015 | Enoki .................... | B60R 16/033 320/139 |
| 11,305,670 | B2 * | 4/2022 | Kim ........................ | B60L 58/20 |
| 2011/0095765 | A1 * | 4/2011 | Tae ......................... | H02J 7/0029 324/426 |
| 2012/0193988 | A1 | 8/2012 | Eschrich et al. | |

(Continued)

FOREIGN PATENT DOCUMENTS

| | | |
|---|---|---|
| JP | 5434879 B2 | 3/2014 |
| JP | 5541134 B2 | 7/2014 |

*Primary Examiner* — M Baye Diao
(74) *Attorney, Agent, or Firm* — Fox Rothschild LLP (57) ABSTRACT

A vehicle battery controlling apparatus is provided and includes a sensor that senses a SOC of a battery connected to a switch among a plurality of batteries and a controller that controls the on/off of the switch based on a first result of determining whether a vehicle enters a fuel-cut section and a second result of comparing the SOC of the battery with at least one or more predetermined reference values. The apparatus improves fuel efficiency by increasing energy regeneration, and improves battery durability by minimizing battery SOC in a non-regeneration section.

18 Claims, 5 Drawing Sheets

(56) References Cited

U.S. PATENT DOCUMENTS

2012/0268058 A1* 10/2012 Enoki ..................... H02J 7/14
  320/104
2018/0191185 A1   7/2018 Al Rasheed et al.
2020/0180532 A1*  6/2020 Lee ........................ B60L 58/14

* cited by examiner

APPARATUS AND METHOD FOR CONTROLLING BATTERY OF VEHICLE

CROSS-REFERENCE TO RELATED APPLICATION

This application claims the benefit of priority to Korean Patent Application No. 10-2020-0050541, filed on Apr. 27, 2020, the entire contents of which are incorporated herein by reference.

TECHNICAL FIELD

The present disclosure relates to an apparatus and method for controlling a battery of a vehicle, and more particularly, to an apparatus and method for controlling a vehicle battery that automatically start an engine when a vehicle is started after the vehicle is stopped and automatically control the SOC of a vehicle battery to effectively supply power to an electric device.

BACKGROUND

Even after the starting of a vehicle is off while a battery is installed in the vehicle, the battery supplies a current for immediate starting and continuously supplies power to other controllers. In particular, as black boxes in vehicles have been recently installed, the amount of electrical energy to be supplied has increased after the starting is off. Accordingly, in some vehicles, two or more batteries are installed, and a technology for receiving power from two or more batteries has been developed.

On the other hand, to improve the fuel efficiency of a vehicle, an idle stop and go (ISG) technology has been recently applied to vehicles. The ISG technology enables an engine to be automatically driven when a vehicle is stopped while the vehicle is being driven, when the engine is automatically stopped and then an accelerator is engaged without pressing the brake at start, or when shifting the gear. To normally operate the ISG, the state of charge (SOC) of the battery needs to be adjusted such that the engine is capable of being started automatically when a vehicle is started after the vehicle is stopped.

SUMMARY

The present disclosure provides a vehicle battery controlling apparatus and method capable of automatically starting an engine when a vehicle is started after the vehicle is stopped and automatically controlling the SOC of a vehicle battery to effectively supply power to an electric device. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle battery controlling apparatus may include a sensor configured to sense a SOC of a battery connected to a switch among a plurality of batteries and a controller configured to execute on/off of the switch based on a first result of determining whether a vehicle enters a fuel-cut section and a second result of comparing the SOC of the battery with at least one or more predetermined reference values. The switch may be disposed between an alternator configured to adjust a voltage supplied to the battery and one battery of the plurality of batteries.

The controller may be configured to turn off the switch to disconnect the battery, in response to determining that the vehicle enters the fuel-cut section, based on the first result and in response to determining that the SOC of the battery exceeds a first reference value, based on the second result. The controller may be configured to turn on the switch and may connect the battery to charge the battery in response to determining that the vehicle enters the fuel-cut section, based on the first result and in response to determining that the SOC of the battery is less than a first reference value, based on the second result.

Additionally, the controller may be configured to turn on the switch and connect the battery to discharge the battery in response to determining that the vehicle does not enter the fuel-cut section, based on the first result and in response to determining that the SOC of the battery exceeds a second reference value, based on the second result. The controller may be configured to compare the SOC of the battery with a third reference value in response to determining that the vehicle does not enter the fuel-cut section, based on the first result and in response to determining that the SOC of the battery is less than a second reference value, based on the second result.

The controller may be configured to turn off the switch to disconnect the battery in response to determining that the SOC of the battery exceeds the third reference value. The controller may be configured to turn on the switch to charge the battery, in response to determining that the SOC of the battery is less than the third reference value. The controller may be configured to turn on the switch to discharge the battery, in response to determining that the vehicle is stopped during an Idle Stop and Go (ISG) operation, based on a third result of determining whether the vehicle is stopped during the ISG operation, and in response to determining that the SOC of the battery exceeds a fourth reference value, based on the second result. The controller may be configured to turn off the switch to disconnect the battery, in response to determining that the vehicle is stopped during the ISG operation, based on the third result and in response to determining that the SOC of the battery does not exceed the fourth reference value, based on the second result.

According to an aspect of the present disclosure, a method for controlling a vehicle battery may include sensing a SOC of a battery connected to a switch among a plurality of batteries and executing on/off of the switch based on a first result of determining whether a vehicle enters a fuel-cut section and a second result of comparing the SOC of the battery with at least one or more predetermined reference values. The switch may be disposed between an alternator configured to adjust a voltage supplied to the battery and one battery of the plurality of batteries.

The method may further include turning off the switch to disconnect the battery in response to determining that the vehicle enters the fuel-cut section, based on the first result and in response to determining that the SOC of the battery exceeds a first reference value, based on the second result. The method may include turning on the switch and connecting the battery to charge the battery in response to determining that the vehicle enters the fuel-cut section, based on the first result and in response to determining that the SOC of the battery is less than a first reference value, based on the second result.

Additionally, the method may include turning on the switch and connecting the battery to discharge the battery in response to determining that the vehicle does not enter the fuel-cut section, based on the first result and in response to determining that the SOC of the battery exceeds a second reference value, based on the second result. The method may include comparing the SOC of the battery with a third reference value in response to determining that the vehicle does not enter the fuel-cut section, based on the first result and in response to determining that the SOC of the battery is less than a second reference value, based on the second result.

The method may further include turning off the switch to disconnect the battery in response to determining that the SOC of the battery exceeds the third reference value. The method may further include turning on the switch to charge the battery in response to determining that the SOC of the battery is less than the third reference value. The method may include turning on the switch to discharge the battery in response to determining that the vehicle is stopped during an Idle Stop and Go (ISG) operation, based on a third result of determining whether the vehicle is stopped during the ISG operation, and in response to determining that the SOC of the battery exceeds a fourth reference value, based on the second result. In addition, the method may include turning off the switch to disconnect the battery in response to determining that the vehicle is stopped during the ISG operation, based on the third result and in response to determining that the SOC of the battery is less than the fourth reference value, based on the second result.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplar)/processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
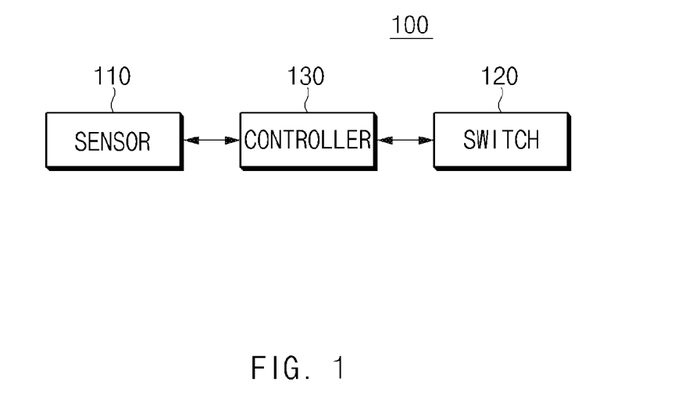
FIG. 1 is a block diagram illustrating a configuration of a vehicle battery controlling apparatus according to an exemplary embodiment of the present disclosure.

FIG. 1 is a block diagram illustrating a configuration of a vehicle battery controlling apparatus according to an exemplary embodiment of the present disclosure. As illustrated in FIG. 1, a vehicle battery controlling apparatus 100 may include a sensor 110, a switch 120, and a controller 130.

The sensor 110 may be configured to detect a state of charge (SOC) of a battery. According to an exemplary embodiment, the sensor 110 may be configured to detect the SOC of the battery connected to the switch 120 among a plurality of batteries. The switch 120 may be disposed between an alternator (not illustrated) and a battery; the switch 120 may be operated to be turned on/off based on a determination of the controller 130; the switch 120 may connect or disconnect the battery to or from the alternator (not illustrated) depending on turn-on/turn-off.

The controller 130 may be implemented by various processing devices such as a microprocessor equipped with a semiconductor chip or the like capable of performing or executing various instructions; the controller 130 may be configured to execute the operation of the vehicle battery controlling apparatus according to an exemplary embodiment of the present disclosure. According to an exemplary embodiment of the present disclosure, the controller 130 may be configured to execute on/off of the switch 120 to control the connection of a battery, based on the first result of determining whether a vehicle has entered a fuel-cut section, the second result of comparing the SOC of the battery with at least one or more preset reference values, and the third result of determining whether the vehicle is stopped during an ISG operation.

Herein, the at least one or more preset reference values may include a first reference value for determining whether the battery is overcharged, a second reference value for determining whether the battery is available, a third reference value indicating a lower limit value at which the battery is available, and a fourth reference value indicating the SOC capable of being restarted after stop during ISG operation. The first reference value may exceed the second reference value; the second reference value may exceed the third reference value; the third reference value may not be less than the fourth reference value.

Referring to the operation of the controller 130 in more detail, the controller 130 may be configured to determine whether the vehicle has entered a fuel-cut section. In particular, the fuel-cut section may be a section in which fuel injection to the engine is stopped when a vehicle is decelerated without engaging the accelerator pedal during driving, and may indicate a section capable of preventing unnecessary fuel consumption. According to an exemplary embodiment, the controller 130 may be configured to determine revolution per minute (RPM) when the vehicle is in the decelerated state; when the RPM exceeds a preset reference RPM, the controller 130 may be configured to stop fuel injection such that a vehicle enters the fuel-cut section. Note that, when the value of a throttle sensor is less than an IDLE value (the value of a throttle position sensor when a driver does not engage an accelerator pedal), the controller 130 may be configured to determine that the vehicle is in a decelerated state.

In response to determining that the vehicle has entered the fuel-cut section, the controller 130 may be configured to determine whether the SOC of the battery exceeds the first reference value. Particularly, the first reference value may be defined as the SOC for determining whether a battery is overcharged. In response to determining that the SOC of the battery exceeds the first reference value, the controller 130 may be configured to determine that the battery is overcharged, operate the switch 120 to be turned off, and disconnect the battery from the alternator. In the meantime, in response to determining that the vehicle has entered the fuel-cut section, and that the SOC of the battery is less the first reference value, the controller 130 may be configured to determine that the battery is not overcharged, operate the battery to be the first voltage by turning on the switch, and allow the battery to be charged. Herein, the first voltage may include about 14.8 V to 15.0 V.

In response to determining that the vehicle has not entered the fuel-cut section, the controller 130 may be configured to determine whether the SOC of the battery exceeds a second reference value. Herein, the second reference value may be defined as a reference SOC capable of determining whether a battery is available. In response to determining that the SOC of the battery exceeds the second reference value, the controller 130 may be configured to determine that the SOC capable of using the battery is satisfied; accordingly, the controller 130 may be configured to turn on the switch to operate the battery to be the second voltage and allow the battery to be discharged.

In the meantime, in response to determining that the vehicle does not enter the fuel-cut section and the SOC of the battery is less than the second reference value, the controller 130 may be configured to determine whether the SOC of the battery exceeds a third reference value. Particularly, the third reference value may be defined as the SOC corresponding to the lower limit value at which the battery is available. In response to determining that the SOC of the battery exceeds the third reference value, the controller 130 may be configured to disable the battery by turning off the switch such that the SOC of the battery does not decrease below the third reference value. In addition, the SOC of the battery exceeds the SOC of the third battery but fails to satisfy the available SOC; and thus the controller 130 may be configured to charge the battery when the vehicle enters the fuel-cut section to exceed the second reference value, that is, such that the SOC capable of using the battery is satisfied.

In response to determining that the SOC of the battery is less than the third reference value, the controller 130 may be configured to determine that battery use is impossible; accordingly, the controller 130 may be configured to turn on the switch to adjust the battery to be a third voltage may charge the battery. Herein, in both the case of not entering the fuel-cut section and the case of entering the fuel-cut section, the battery may be operated and charged to be the third voltage. According to an exemplary embodiment, the third voltage may include about 13.8 V to 14.5 V.

As described above, the controller 130 may be configured to compare the SOC of the battery with first to third reference values; control the charging or discharging of the battery by turning on the switch based on the comparison result; alternatively, the controller 130 may be configured to operate the battery to maintain an available SOC (e.g., the second reference value) by turning off the switch to disable the battery. In other words, the controller 130 may be configured to adjust the SOC of the battery to be maintained in a state of exceeding the second reference value.

The controller 130 may be configured to operate the switch such that the SOC of the battery exceeds the second reference value, and then determine whether the vehicle is stopped during an ISG operation. In response to determining that the vehicle is stopped during the ISG operation, the controller 130 may be configured to determine that the starting of the vehicle is off, determine whether a battery SOC is available for restarting after starting off due to stopping, and determine whether the SOC of the battery exceeds the fourth reference value. In particular, the fourth reference value may be defined as a value equal to or greater than an available lower limit value (e.g., the third reference value) of the battery.

In response to determining that the SOC of the battery exceeds the fourth reference value, the controller 130 may be configured to determine that the SOC capable of restarting after starting off due to stopping is satisfied; in this case, the controller 130 may be configured to turn on the switch such that the battery is used to restart the vehicle. In the meantime, in response to determining that the SOC of the battery is less than the fourth reference value, the controller 130 may be configured to determine that the SOC capable of restarting after starting off due to stopping is not satisfied; in this case, the controller 130 may be configured to prohibit the use of the battery by turning off the switch since the battery is not used to restart the vehicle.

Besides, when the controller 130 enters the fuel-cut section, the controller 130 may be configured to turn on the switch to charge the battery; when the SOC capable of being restarted is satisfied due to charging, the controller 130 may be configured to turn on the switch at the time of restart such that the battery is used to restart the vehicle. Afterward, the controller 130 may be configured to determine an ignition-off for parking, not an ignition-off due to a stop during driving; in the case of the ignition-off for parking, the operation of the controller 130 may be terminated.

Figure 2:
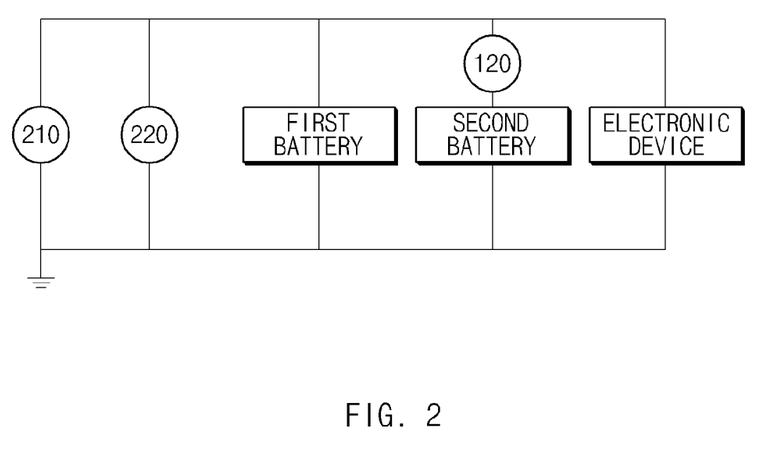
FIG. 2 is a diagram illustrating a connection state of a battery according to an exemplary embodiment of the present disclosure.

FIG. 2 is a diagram illustrating a connection state of a battery according to an exemplary embodiment of the present disclosure. As illustrated in FIG. 2, an alternator 210, a starter motor 220 capable of being turning on an ignition using a battery, a first battery, a second battery, and electronic device may be connected in a parallel structure. Herein, the alternator 210 may be configured to adjust voltages applied to the first battery and the second battery based on the control signal of the controller 130. The first battery may include a lead-acid battery; the second battery may include a lithium-ion battery; and the electronic device may include an electronic device mounted within a vehicle. The switch 120 may be disposed between the alternator 210 and the second battery; the on/off of the switch 120 may be executed based on the control signal of the controller 130 to be connected to or disconnected to or from the alternator 210 and the starter motor 220.

Figure 3:
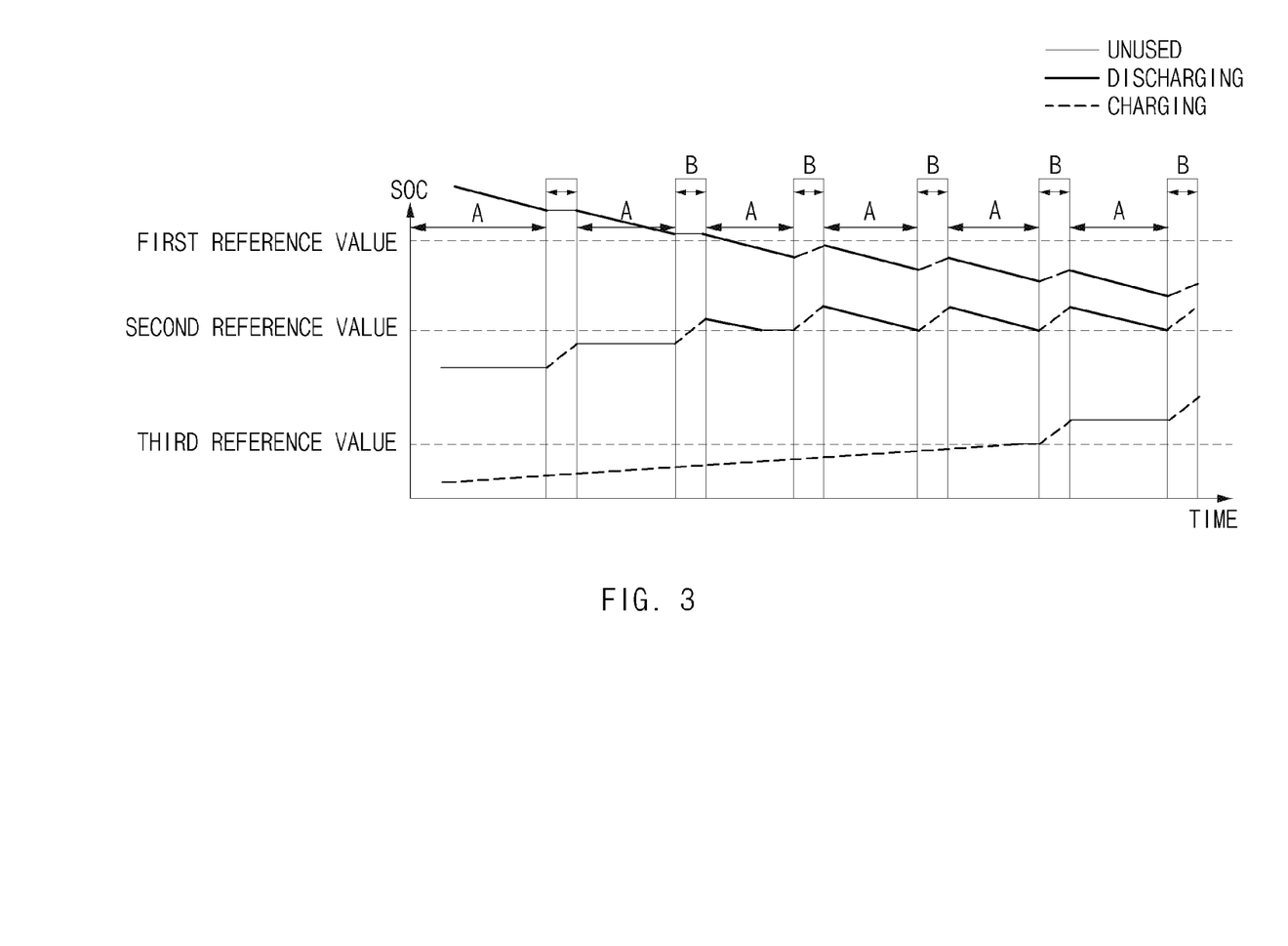
FIG. 3 is a view schematically illustrating a control for maintaining battery SOC according to an exemplary embodiment of the present disclosure.

FIG. 3 is a view schematically illustrating a control for maintaining battery SOC according to an exemplary embodiment of the present disclosure. As illustrated in FIG. 3, the controller 130 may be configured to control the on/off of a switch to operate the battery, based on the result of comparing the SOC of a vehicle battery with at least one reference value and the result of determining whether the vehicle has entered section (A) that is not in a fuel-cut state or whether the vehicle has entered section (B) that is in the fuel-cut state. Herein, at least one reference value may include a first reference value to a third reference value; the first reference value may be set to exceed the second reference value; the second reference value may be set to exceed the third reference value.

According to an exemplary embodiment, when the controller 130 determines that the vehicle enters section (A) where the vehicle is not in the fuel-cut state and the SOC of the vehicle battery exceeds the first reference value, the controller 130 may be configured to turn on the switch to discharge the battery. Furthermore, when the controller 130 determines that the vehicle enters section (B) where the vehicle is in the fuel-cut state and the SOC of the vehicle battery exceeds the first reference value, the controller 130 may be configured to turn off the switch such that the battery is not used.

Additionally, when the controller 130 determines that the vehicle enters section (A) where the vehicle is not in the fuel-cut state and the SOC of the vehicle battery is less than the first reference value and exceeds the second reference value, the controller 130 may be configured to turn on the switch to discharge the battery. Furthermore, when the controller 130 determines that the vehicle enters section (B) where the vehicle is in the fuel-cut state and the SOC of the vehicle battery is less than the first reference value and exceeds the second reference value, the controller 130 may be configured to turn on the switch to charge the battery.

According to an exemplary embodiment, when the controller 130 determines that the vehicle enters section (A) where the vehicle is not in the fuel-cut state and the SOC of the vehicle battery is less than the second reference value and exceeds the third reference value, the controller 130 may be configured to turn off the switch such that the battery is not used. Furthermore, when the controller 130 determines that the vehicle enters section (B) where the vehicle is in the fuel-cut state and the SOC of the vehicle battery is less than the second reference value and exceeds the third reference value, the controller 130 may be configured to turn on the switch to charge the battery. When the controller 130 determines that the SOC of the vehicle battery is less than the third reference value, the controller 130 may be configured to continuously turn on the switch to charge the battery when the vehicle enters section (B) where the vehicle is in the fuel-cut state and when the vehicle has entered section (A) that is not in the fuel-cut state.

Figure 4:
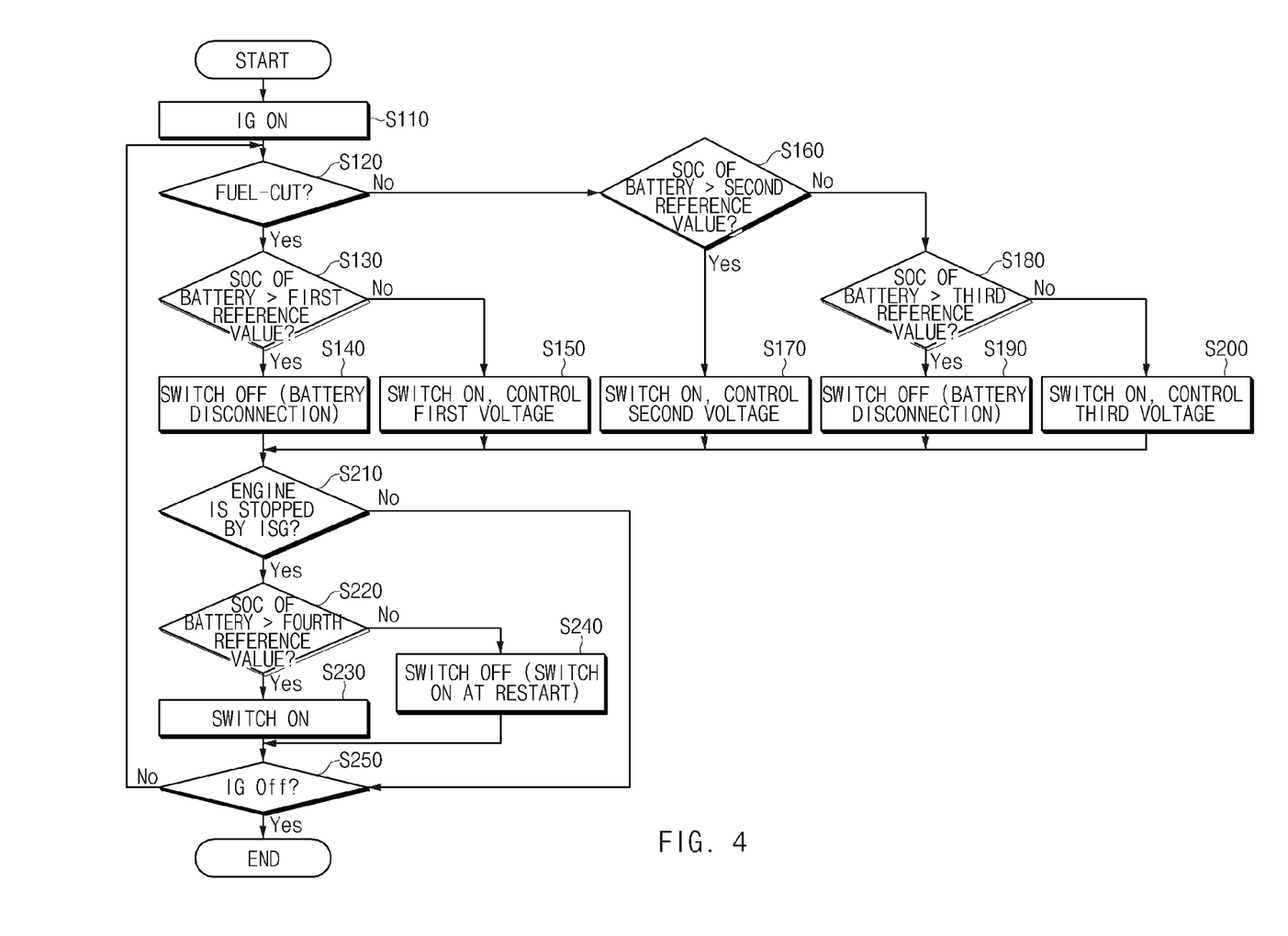
FIG. 4 is a flowchart illustrating a method for controlling a vehicle battery according to an exemplary embodiment of the present disclosure.

FIG. 4 is a flowchart illustrating a method for controlling a vehicle battery according to an exemplary embodiment of the present disclosure. As illustrated in FIG. 4, according to an exemplary embodiment of the present disclosure, when the controller 130 determines that a vehicle is in a starting state (S110), the controller 130 may be configured to determine whether the vehicle has entered a fuel-cut section (S120). In S120, the fuel-cut section may be a section in which fuel injection to the engine is stopped when a vehicle is decelerated without pressing the accelerator pedal during driving, and may indicate a section capable of preventing unnecessary fuel consumption.

In S120, in response to determining that the vehicle has entered the fuel-cut section (Y), the controller 130 may be configured to determine whether the SOC of the battery exceeds the first reference value (S130). In particular, the first reference value may be defined as the SOC for determining whether a battery is overcharged. In S130, in response to determining that the SOC of the battery exceeds the first reference value (Y), the controller 130 may be configured to determine that the battery is overcharged, operate the switch 120 to be turned off, and disconnect the battery from the alternator (S140).

In the meantime, in S120, when the controller 130 determines that the vehicle has entered the fuel-cut section (Y), and determines that the SOC of the battery is less than the first reference value in S130 (N), the controller 130 may be configured to determine that the battery is not overcharged, operate the battery to be the first voltage by turning on the switch, and allow the battery to be charged (S150). Herein, the first voltage may include about 14.8 V to 15.0 V. In S120, in response to determining that the vehicle has not entered the fuel-cut section (N), the controller 130 may be configured to determine whether the SOC of the battery exceeds a second reference value (S160). Herein, the second reference value may be defined as a reference SOC capable of determining whether a battery is available. In S160, when the controller 130 determines that the SOC of the battery exceeds the second reference value (Y), the controller 130 may be configured to determine that the SOC capable of using the battery is satisfied; Accordingly, the controller 130 may be configured to turn on the switch to operate/adjust the battery to be the second voltage and allow the battery to be discharged (S170).

In the meantime, in S120, when the controller 130 determines that the vehicle does not enter the fuel-cut section (N) and the SOC of the battery is less than the second reference value in S160 (Y), the controller 130 may be configured to determine whether the SOC of the battery exceeds a third reference value (S180). In particular, the third reference value may be defined as the SOC corresponding to the lower limit value at which the battery is available. In S180, when the controller 130 determines that the SOC of the battery exceeds the third reference value (Y), the controller 130 may be configured to disable the battery by turning off the switch such that the SOC of the battery does not decrease below the third reference value (S190).

In S180, when the controller 130 determines that the SOC of the battery is less than the third reference value (N), the controller 130 may be configured to determine that battery use is impossible; accordingly, the controller 130 may be configured to turn on the switch to control the battery to be a third voltage and charge the battery (S200). Herein, in both the case of not entering the fuel-cut section and the case of entering the fuel-cut section, the battery may be operated and charged to be the third voltage. According to an exemplary embodiment, the third voltage may include about 13.8 V to 14.5 V.

Through operations S120 to S200, the controller 130 may be configured to compare the SOC of the battery with first to third reference values; the controller 130 may be configured to control the charging or discharging of the battery by turning on the switch based on the comparison result; alternatively, the controller 130 may be configured to operate the battery to maintain an available SOC (e.g., the second reference value) by turning off the switch to disable the battery. In other words, the controller 130 may be configured to control the SOC of the battery to be maintained in a state of exceeding the second reference value.

After the SOC of battery is controlled to maintain the state of exceeding the second reference value, the controller 130 may be configured to determine whether the vehicle is stopped during an ISG operation (S210). In S210, when the controller 130 determines that the vehicle is stopped during the ISG operation, the controller 130 may be configured to determine that the starting of the vehicle is off; to determine whether a battery SOC is available for restarting after starting off due to stopping, the controller 130 may be configured to determine whether the SOC of the battery exceeds the fourth reference value (S220). In S220, when the controller 130 determines that the SOC of the battery exceeds the fourth reference value, the controller 130 may be configured to determine that the SOC capable of restarting after starting off due to stopping is satisfied; in this case, the controller 130 may be configured to turn on the switch such that the battery is used to restart the vehicle.

In the meantime, in S220, when the controller 130 determines that the SOC of the battery does not exceed the fourth reference value (N), the controller 130 may be configured to determine that the SOC capable of restarting after starting off due to stopping is not satisfied; in this case, the controller 130 may be configured to prohibit the use of the battery by turning off the switch since the battery is not used to restart the vehicle (S240). Besides, in S240, when the controller 130 enters the fuel-cut section, the controller 130 may be configured to turn on the switch to charge the battery; when the SOC capable of being restarted is satisfied due to charging, the controller 130 may be configured to turn on the switch at the time of restart such that the battery is used to restart the vehicle. Afterward, the controller 130 may be configured to determine an ignition-off for parking, not an ignition-off due to a stop during driving (S250); in the case of the ignition-off for parking in S250 (Y), the operation of the controller 130 may be terminated. In S250, when the ignition for parking is not turned off, the controller 130 may perform S120.

Figure 5:
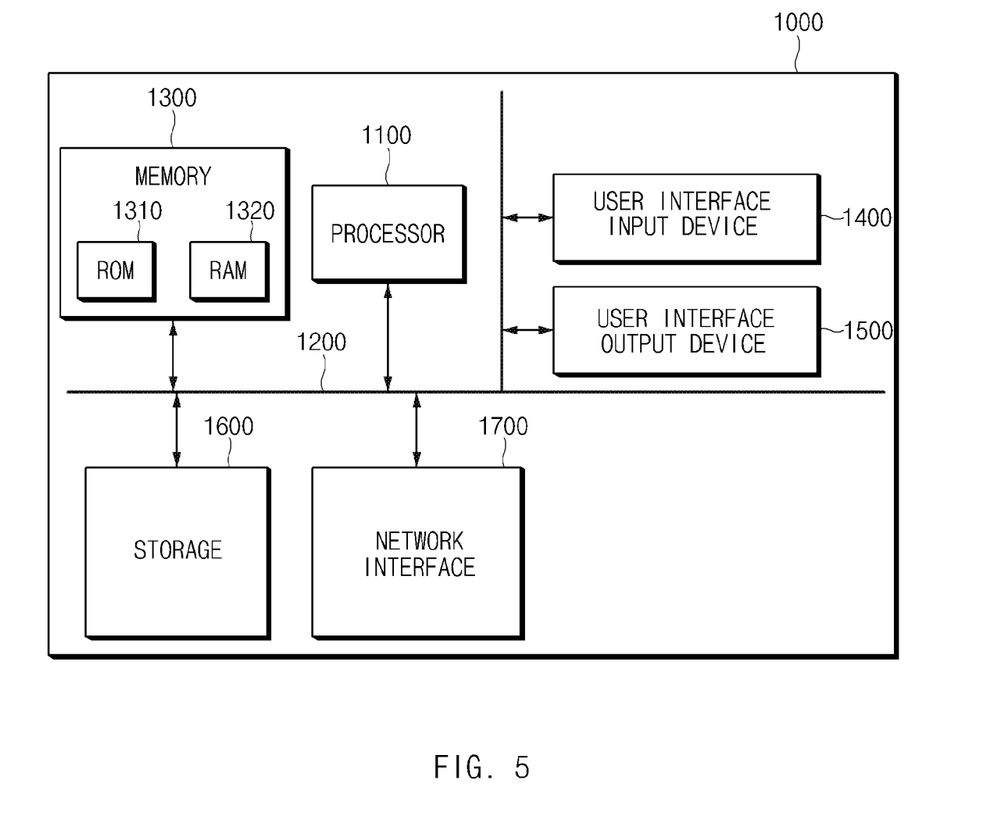
FIG. 5 is a block diagram illustrating a configuration of a computing system performing a method, according to an exemplary embodiment of the present disclosure.

FIG. 5 is a block diagram illustrating a configuration of a computing system performing a method, according to an exemplary embodiment of the present disclosure. Referring to FIG. 5, a computing system 1000 may include at least one processor 1100, a memory 1300, a user interface input device 1400, a user interface output device 1500, storage 1600, and a network interface 1700, which are connected with each other via a bus 1200. The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

According to an exemplary embodiment of the present disclosure, an apparatus and method for controlling a battery of a vehicle may adjust the SOC of the battery to automatically start an engine when a vehicle is started after the vehicle is stopped. It may be possible to improve fuel efficiency by increasing energy regeneration during vehicle deceleration by including two batteries. In a non-regeneration section, the SOC of a battery may be minimized, thereby improving battery durability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle battery controlling apparatus, comprising:
a sensor configured to sense a state of charge (SOC) of a battery connected to a switch among a plurality of batteries; and a controller configured to control on/off of the switch based on a first result of determining whether a vehicle enters a fuel-cut section and a second result of comparing the SOC of the battery with at least one or more predetermined reference values, wherein the controller is configured to turn on the switch to discharge the battery in response to determining that the vehicle is stopped during an Idle Stop and Go (ISG) operation, based on a third result of determining whether the vehicle is stopped during the ISG operation, and in response to determining that the SOC of the battery exceeds a reference value equal to or greater than an available lower limit value of the battery, based on the second result.

2. The vehicle battery controlling apparatus of claim 1, wherein the switch is disposed between an alternator configured to adjust a voltage supplied to the battery and one battery of the plurality of batteries.

3. The vehicle battery controlling apparatus of claim 1, wherein the controller is configured to turn off the switch to disconnect the battery in response to determining that the vehicle enters the fuel-cut section, based on the first result and in response to determining that the SOC of the battery exceeds a first reference value, based on the second result.

4. The vehicle battery controlling apparatus of claim 1, wherein the controller is configured to turn on the switch and connect the battery to charge the battery in response to determining that the vehicle enters the fuel-cut section, based on the first result and in response to determining that the SOC of the battery does not exceed a first reference value, based on the second result.

5. The vehicle battery controlling apparatus of claim 4, wherein the controller is configured to turn on the switch and connect the battery to discharge the battery in response to determining that the vehicle does not enter the fuel-cut section, based on the first result and in response to determining that the SOC of the battery exceeds a second reference value, based on the second result.

6. The vehicle battery controlling apparatus of claim 5, wherein the controller is configured to compare the SOC of the battery with a third reference value in response to determining that the vehicle does not enter the fuel-cut section, based on the first result and in response to determining that the SOC of the battery does not exceed a second reference value, based on the second result.

7. The vehicle battery controlling apparatus of claim 6, wherein the controller is configured to turn off the switch to disconnect the battery in response to determining that the SOC of the battery exceeds the third reference value.

8. The vehicle battery controlling apparatus of claim 6, wherein the controller is configured to turn on the switch to charge the battery in response to determining that the SOC of the battery is less than the third reference value.

9. The vehicle battery controlling apparatus of claim 1, wherein the controller is configured to turn off the switch to disconnect the battery in response to determining that the vehicle is stopped during the ISG operation, based on the third result and in response to determining that the SOC of the battery is less than the fourth reference value, based on the second result.

10. A method for controlling a vehicle battery, comprising:

sensing, by a sensor, a state of charge (SOC) of a battery connected to a switch among a plurality of batteries;

executing, by a controller, on/off of the switch based on a first result of determining whether a vehicle enters a fuel-cut section and a second result of comparing the SOC of the battery with at least one or more predetermined reference values; and turning on the switch to discharge the battery in response to determining that the vehicle is stopped during an Idle Stop and Go (ISG) operation, based on a third result of determining whether the vehicle is stopped during the ISG operation, and in response to determining that the SOC of the battery exceeds a reference value equal to or greater than an available lower limit value of the battery, based on the second result.

11. The method of claim 10, wherein the switch is disposed between an alternator configured to adjust a voltage supplied to the battery and one battery of the plurality of batteries.

12. The method of claim 10, further comprising:

turning off the switch to disconnect the battery in response to determining that the vehicle enters the fuel-cut section, based on the first result and in response to determining that the SOC of the battery exceeds a first reference value, based on the second result.

13. The method of claim 10, further comprising:

turning on the switch and connecting the battery to charge the battery in response to determining that the vehicle enters the fuel-cut section, based on the first result and in response to determining that the SOC of the battery is less than a first reference value, based on the second result.

14. The method of claim 13, further comprising:

turning on the switch and connecting the battery to discharge the battery in response to determining that the vehicle does not enter the fuel-cut section, based on the first result and in response to determining that the SOC of the battery exceeds a second reference value, based on the second result.

15. The method of claim 14, further comprising:

comparing the SOC of the battery with a third reference value in response to determining that the vehicle does not enter the fuel-cut section, based on the first result and in response to determining that the SOC of the battery is less than a second reference value, based on the second result.

16. The method of claim 15, further comprising:

turning off the switch to disconnect the battery in response to determining that the SOC of the battery exceeds the third reference value.

17. The method of claim 15, further comprising:

turning on the switch to charge the battery in response to determining that the SOC of the battery is less than the third reference value.

18. The method of claim 10, further comprising:

turning off the switch to disconnect the battery in response to determining that the vehicle is stopped during the ISG operation, based on the third result and in response to determining that the SOC of the battery is less than the fourth reference value, based on the second result.

* * * * *